June 20, 1950            M. MALLORY            2,512,254
JET ENGINE, INCLUDING RECIPROCATING
PRESSURE GAS GENERATOR
Filed Dec. 13, 1944            2 Sheets-Sheet 2
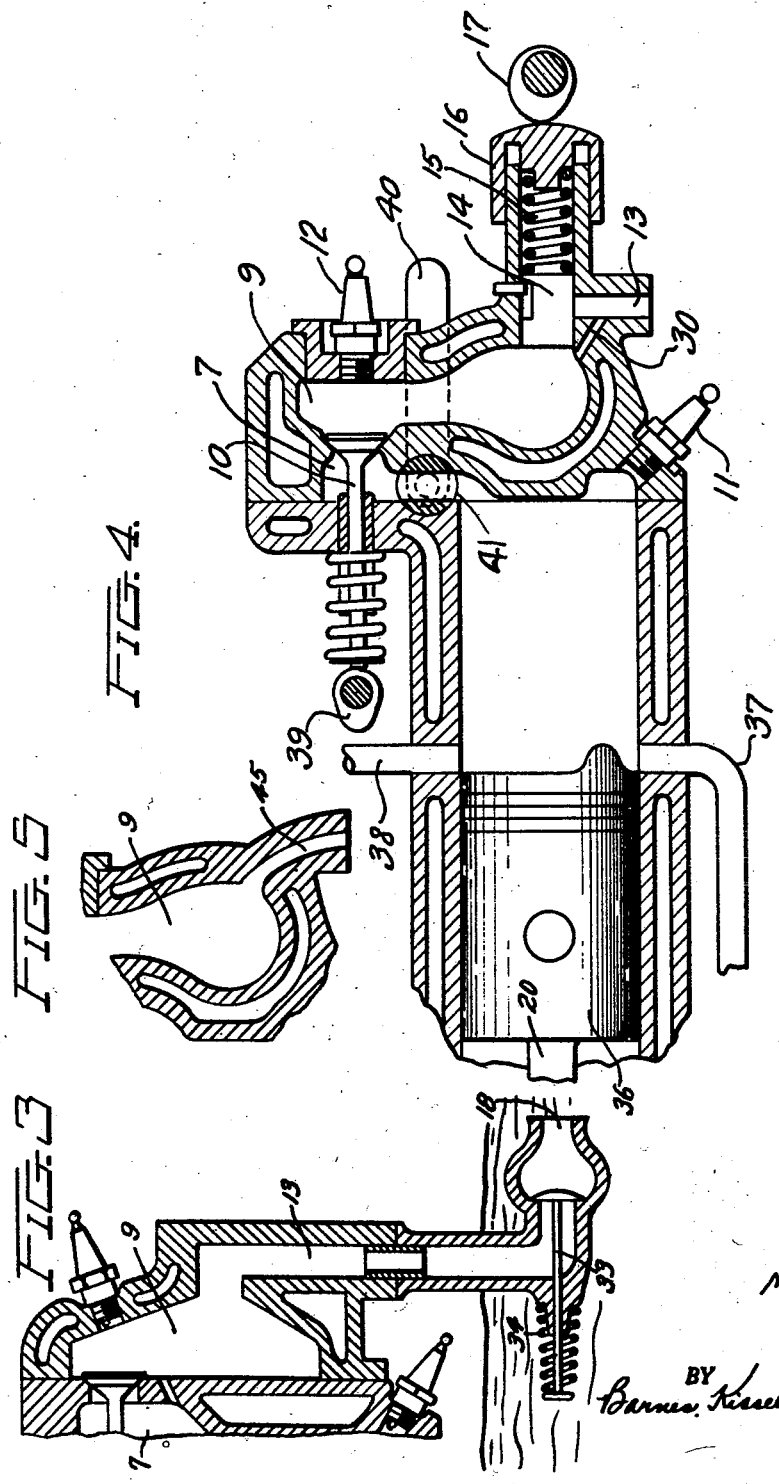
Marion Mallory
INVENTOR.
BY *Barnes, Kisselle, Laughlin & Laird*
Attorneys Patented June 20, 1950

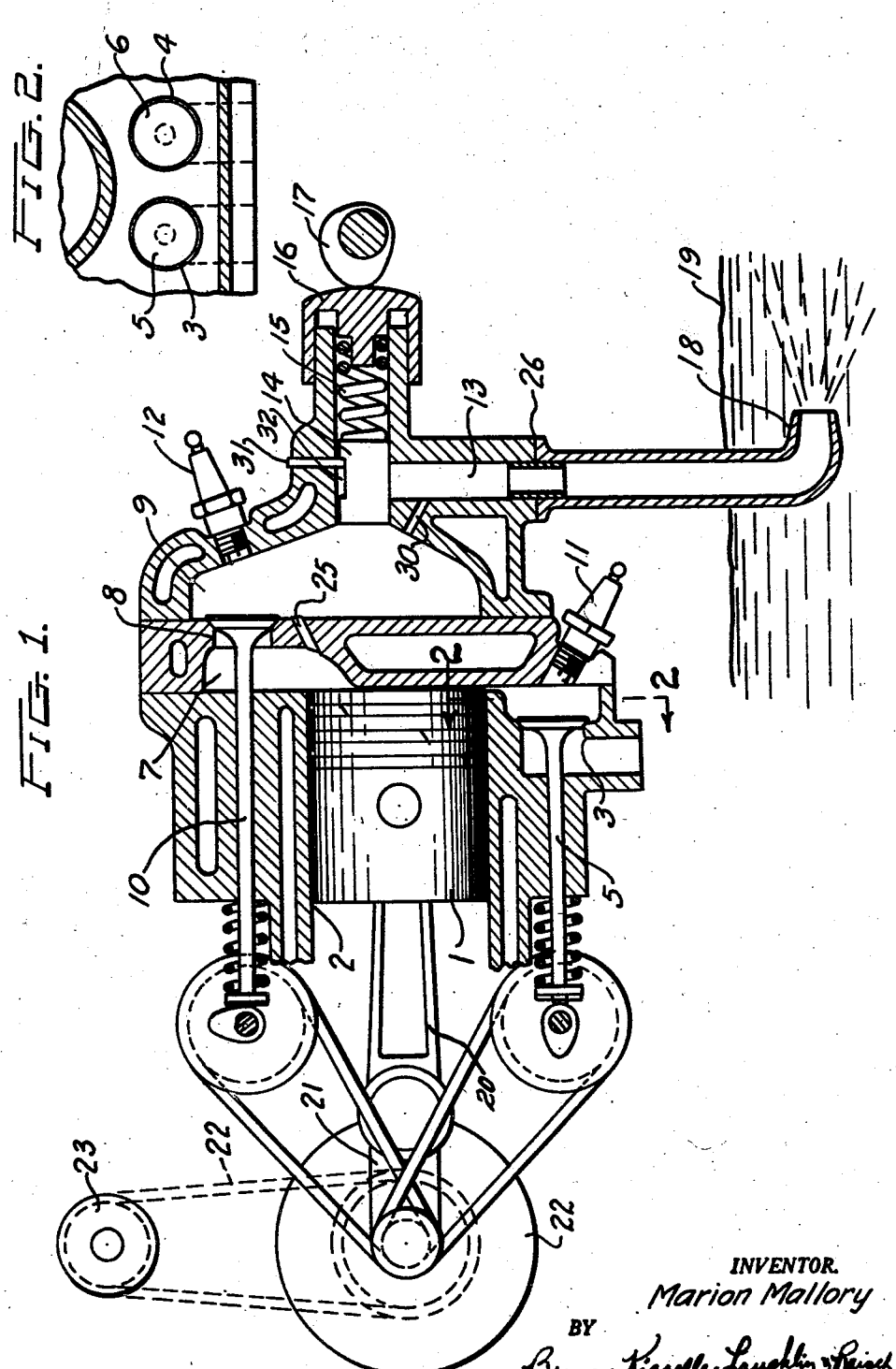

2,512,254

UNITED STATES PATENT OFFICE 2,512,254

JET ENGINE, INCLUDING RECIPROCATING PRESSURE GAS GENERATOR

Marion Mallory, Detroit, Mich.

Application December 13, 1944, Serial No. 568,046

9 Claims. (Cl. 60—35.6)

This invention relates to an internal combustion power unit of the jet propulsion type, in which the explosion pressures are discharged in water for driving boats, or can be discharged into atmosphere or against turbine wheels to develop power.

Fig. 1 is a sectional view showing my jet propulsion engine.

Fig. 2 is a section along the line 2—2 of Fig. 1.

Fig. 3 shows a detail modification of the engine shown in Fig. 1.

Fig. 4 is a section through an engine showing my principle of operation applied to a two-cycle engine instead of a four-cycle engine as shown in Fig. 1.

Fig. 5 is a fragmentary sectional view showing a slight modification in the combustion chamber over that shown in Fig. 4.

The parts of the engine shown in Fig. 1 are as follows: reciprocating piston 1, cylinder 2, intake port 3 and exhaust port 4 for cylinder 2 controlled respectively by intake valve 5 and exhaust valve 6, primary combustion chamber 7, outlet 8 from the primary combustion chamber 7 to the secondary combustion chamber 9, valve 10 controlling port 8, electric spark plugs 11 and 12 respectively for the primary and secondary combustion chambers, passageway 13 leading from secondary combustion chamber 9 and controlled by piston valve 14, compression spring 15 mounted between valve 14 and plunger 16 actuated by cam 17 driven from the engine shaft. Conduit 13 terminates in nozzle 18.

For purposes of illustration, nozzle 18 is shown beneath the surface 19 of a body of water so that the explosive gases are discharged into the water for the purpose, for example, of propelling a boat.

Piston 1 is connected by connecting rod 20 to crankshaft 21 upon which is mounted flywheel 22. Accessory power shaft 23 is driven by a chain drive 22 from crankshaft 21. Valves 5, 6 and 10 are cam actuated by power derived from the crankshaft 21 in the conventional manner.

The operation of the engine is as follows: The engine is started by rotating crankshaft 21 which moves piston 1 towards the outer or left hand end of cylinder 2. Intake valve 5 opens permitting a fuel-air mixture or charge to be drawn into the cylinder, valve 10 being closed. As the piston moves inwardly or toward the right, Fig. 1, valve 10 opens and the piston compresses the fuel charge into the primary and secondary combustion chambers 7 and 9. Near or at the end of the compression stroke of piston 1 valve 10 closes and ignition takes place in combustion chambers 7 and 9. Valve 10 remains closed throughout the power stroke of piston 1. The fuel charge in the combustion chambers is ignited by spark plugs 11 and 12. If desired, a firing port 25 can be used to ignite the charge in the combustion chamber 7 instead of spark plug 11. The use of firing port 25 is optional. When firing port 25 is used, spark plug 12 ignites the charge in the secondary combustion chamber 9 and the flame from the explosion will pass through the firing port 25 and ignite the charge in combustion chamber 7. The greater part of the charge is compressed and trapped by closed valve 10 in the secondary combustion chamber 9. When the explosion takes place in combustion chamber 9, piston valve 14 will be forced upwardly against compression spring 15, releasing the gases of combustion under high pressure into the conduit 13 and out of nozzle 18. These gases being discharged through the jet into the water will drive a boat, or discharged against a turbine wheel will develop power. It is understood that conduit 18 can be rotated about joint 26 to steer the boat.

At the end of the compression stroke of piston 1 there will be just enough fuel charge left in combustion chamber 7, which charge upon being exploded will drive piston 1 outwardly on its power stroke so that the reciprocating four-cycle engine acts primarily as a pump for pumping the fuel charge into the secondary combustion chamber 9. Thus, practically only sufficient power is generated in combustion chamber 7 to rotate crankshaft 21 for operating the cams which control several valves above described and for reciprocating piston 1 to pump the fuel into the secondary combustion chamber 9.

Cam 17 operates so as to compress spring 15 on the compression stroke of piston 1 so that valve 14 cannot be moved by the compression of the fuel charge in combustion chamber 9 to release the fuel charge from combustion chamber 9 into conduit 13. When cam 17 compresses spring 15 against piston 14 only the explosion pressures in combustion chamber 9 is sufficient to open valve 14 to release the exhaust gases from chamber 9 into conduit 13. Almost simultaneously with the explosion in chamber 9, cam 17 rotates away from plunger 16 to greatly release the compression on spring 15 and thus permit piston valve 14 to move outwardly or toward the right due to the pressure of the gases existing in combustion chamber 9. In fact, the lowest pressure of combustion in combustion chamber 9 will open piston valve 14 after cam 17 has released the compression of spring 15.

The exhaust gases remaining in combustion chamber 7 will escape through exhaust port 4 on the exhaust stroke of piston 1. Since, as above explained, only a small charge of fuel mixture is burned over piston 1, it will only be necessary to use a small exhaust port 4 to release the burned gases from combustion chamber 7 on the exhaust stroke of piston 1.

If desired, a small relief port 30 can be used to vent out the low pressures existing in combustion chamber 9 when the pressure is too low to raise valve 14. Port 30 is of such size that it will permit a slight leakage during the compression stroke. However, if there is considerable pressure existing in chamber 9 when piston 1 is making its compression stroke, the compression will be higher in combustion chambers 7 and 9 on the compression stroke of the piston. Therefore, more energy will be dissipated out of conduit 13 due to the high compression. There will not be detonation in chamber 7 because only a small portion of the charge is burned in this chamber and detonation cannot occur in chamber 9 due to relief valve 14. Pin 31 slidably engages valve 14 in slot 32 to prevent the valve 14 from falling into the combustion chamber.

In the modified form shown in Fig. 3, the engine is identical with that shown in Fig. 1 except that pressure relief valve 14, spring 15, plunger 16 and cam 17 are omitted and conduit 13 is connected directly to combustion chamber 9 and serves as the sole outlet for the explosive pressures generated in chamber 9. A pressure relief valve 33, normally held closed by compression spring 34, is located in conduit 13 near outlet 18. The nozzle opening 18 is preferably a smaller opening than the opening 35 controlled by a pressure relief valve 33.

The engine shown in Fig. 4 operates on the same principle as far as generating jet power is concerned except that the reciprocating engine which acts as a pump for charging the primary combustion chamber 9 is a two-cycle engine. In this engine, Fig. 4, reciprocating piston 36 operates on a two-cycle stroke forcing a charge into combustion chamber 7 every time it moves inwardly or toward the right. Conduit 37 admits a fuel-air charge in the conventional manner and the exhaust gases are exhausted from exhaust port 38, also in a conventional manner. Cam 39 which controls valve 10 operates at engine speed and opens valve 10 during the compression stroke of piston 36.

For starting the engine, if desired, all of the charge can be maintained in the primary combustion chamber 7. This will make the compression higher and the engine will be easier to start when cold. This compression is maintained in chamber 7 by moving lever 40 which closes valve 41 which, when closed, separates or shuts off the upper portion of combustion chamber 7 from the portion of the chamber over piston 36, as viewed in Fig. 4. After the engine is started, valve 41 can be opened so that the power can be developed from the secondary combustion chamber 9. This would keep the charge in the combustion chamber for starting and warming up the engine. Spark plugs 11 and 12 fire approximately simultaneously at or near the end of compression stroke 36.

As above explained, the power generated over piston 36 is low due to the small amount of charge burned in chamber 7, but the power is sufficient for pumping the compressed fuel charge into the secondary combustion chamber 9.

Since the majority of the fuel charge is burned in chamber 9 and only a small portion of the fuel charge is burned in chamber 7, therefore the pressure in the engine cylinder, Fig. 4, will be low when the piston reaches the end of its outward stroke and opens intake port 37. Therefore, the power required for charging the cylinder through intake port 37 is low.

Fig. 5 shows a modification of my engines. Valve 14 has been omitted so that combustion chamber 9 communicates directly with the atmosphere through conduit 45 which serves as a jet nozzle. When valve 14 is omitted, a substantially continuous pressure issues from the nozzle and particularly at higher engine speeds because of the rapidity with which the charge is fed or forced through port 8 into chamber 9.

It is, of course, understood that air alone for supporting combustion can be drawn into the cylinder through intake port 3 and that hydrocarbon fuel can be supplied to the combustion chambers 7 and 9 by injection either into combustion chamber 7 alone or into both combustion chambers 7 and 9. In such case a conventional injection nozzle will be provided for either or both chambers 7 and 9. If an injection nozzle is provided for chamber 7 only, then fuel will be injected into chamber 7 while valve 10 is open and the air is being compressed and flowing from chamber 7 into chamber 9.

I claim:

1. In combination, a reciprocating engine, means for supplying the combustion chamber of said engine with a fuel mixture, a secondary combustion chamber, a port between said combustion chambers, means controlling said port, said means holding said port open during the compression stroke of said engine whereby the fuel mixture is compressed substantially simultaneously in both chambers and closing said port during the burning of the gas mixtures in said chambers, an outlet for discharging the burning, expanding fuel mixture from said second chamber in the form of a jet, and a valve controlling the said outlet, said valve opening in response to a predetermined pressure in said secondary combustion chamber.

2. In combination, a reciprocating engine, means for supplying the combustion chamber of said engine with a fuel mixture, a secondary combustion chamber, a port between said combustion chambers, means controlling said port, said means holding said port open during the compression stroke of said engine whereby the fuel mixture is compressed substantially simultaneously in both chambers and closing said port during the burning of the gas mixtures in said chambers, an outlet for discharging the burning, expanding fuel mixture from said second chamber in the form of a jet, and a valve for controlling said outlet, resilient means for closing said valve, and means for varying the force which the resilient means exerts against said valve whereby the resilient means exerts a greater force against said valve during the compression stroke of said engine than during the burning of the fuel mixture in the secondary combustion chamber, the said valve opening in response to a predetermined pressure of combustion in the secondary combustion chamber.

3. In combination, an internal combustion engine comprising a primary combustion chamber, a secondary combustion chamber, a port connecting said primary and secondary combustion chambers, means for charging said primary and secondary combustion chambers with a combustible fluid mixture, means operating in said primary chamber for compressing said fluid mixture in both of said chambers, a valve controlling said port between said chambers, said valve being open during the compressing of the fluid mixture in said chambers, said valve being closed during the burning of the fluid mixtures in said chambers, the combustion energy of the fluid mixture in the primary chamber being utilized for operating said compressing means, and an outlet through which the burning fluid mixture from the secondary chamber discharges in the form of a reactive jet, a valve controlling said outlet arranged to open whenever the pressure in the secondary chamber exceeds a predetermined value.

4. In combination, an internal combustion engine comprising a combustion chamber, a second combustion chamber, a port connecting said first and second combustion chambers, means for compressing a combustible fluid mixture in said chambers, said means being operated by the combustion energy of said fluid mixture in said first mentioned combustion chamber, a valve controlling said port arranged to be open during the compression of the fluid mixture in the said chambers, said valve being arranged to close said port during the burning of the fluid mixtures in the first and second combustion chambers, means for igniting the fluid mixtures in said chambers, and an outlet through which the burning fluid mixture from the second chamber discharges in the form of a reactive jet, a valve controlling said outlet, resilient means for yieldably holding said valve closed, and means for varying the force that the resilient means exerts on said valve whereby the force exerted by the resilient means resisting the opening of said valve is greatest during the compressing of the fluid mixture in said second chamber and is smallest during the combustion of said fluid mixture in said second chamber.

5. In combination, an internal combustion engine comprising a combustion chamber, a second combustion chamber, a port connecting said first and second combustion chambers, means for compressing a combustible fluid mixture in said chambers, said means being operated by the combustion energy of said fluid mixture in said first mentioned combustion chamber, a valve controlling said port arranged to be open during the compression of the fluid mixture in the said chambers, said valve being arranged to close said port during the burning of the fluid mixtures in the first and second combustion chambers, means for igniting the fluid mixtures in said chambers, a conduit leading from said second chamber, a jet orifice at the end of said conduit, a valve controlled port in said conduit between the jet orifice and the second combustion chamber having a greater area than the area of the jet orifice, said valve opening in response to a predetermined pressure in the second combustion chamber.

6. In combination with an internal combustion engine comprising a cylinder, a reciprocating piston in said cylinder, intake and exhaust ports for said cylinder, and ignition means for igniting the fuel mixture charge which has been compressed by the piston, said engine having a combustion chamber in which a minor portion of the fuel mixture charge is compressed on the compression stroke of said piston, a second combustion chamber, a valve controlled port connecting the first and second combustion chambers, the major portion of the fuel mixture charge being compressed in the second combustion chamber, the said valve controlled port being closed during the burning of the fuel mixture in the said combustion chambers, and a nozzle through which the burning charge in the second chamber is discharged in the form of a power jet, the burning of the minor portion of the charge in the first combustion chamber serving to operate said reciprocating engine which serves as a pump for forcing fluid from the first combustion chamber through the port into the second combustion chamber and for compressing the fuel mixture charge in both of said combustion chambers preparatory to igniting the same.

7. In combination, primary and secondary combustion chambers, means for introducing a combustible fluid mixture into said chambers and for substantially simultaneously compressing the fluid mixture in said chambers, a communication between said chambers, means for igniting the fluid mixture in said chambers whereby combustion occurs substantially simultaneously in said chambers, means for closing the communication between the chambers during the burning of said fluid mixtures in said combustion chambers, and means for utilizing the combustion energy of the mixture in the primary chamber to operate the fluid mixture introducing and compressing means, and means for discharging the hot products of combustion from the other chamber in the form of a jet, and valve means for cutting off a portion of said combustion chambers adjacent said compressing means whereby all of the charge can be maintained in said portion of said combustion chambers to raise the compression and facilitate starting of the engine.

8. In combination, an internal combustion engine comprising a primary combustion chamber, a secondary combustion chamber, a main port connecting said chambers, means for charging gas into said primary chamber, means to compress the gas charge in said primary chamber, means to fire a charge in one of said chambers, and a constantly open bleed port between said chambers through which ignited gas may pass from the chamber having said firing means to the other chamber to fire the charge in said other chamber, a valve controlling said main port, means holding the valve open during said compression and closed during combustion in said chambers, the energy of combustion in said primary chamber operating said charging and compressing means, and an outlet through which gases from the secondary chamber discharge in the form of a reactive jet.

9. In combination, an internal combustion engine comprising a cylinder and piston, means utilizing the force of combustion in the cylinder upon the piston to charge gas into the cylinder and compress it therein, a secondary combustion chamber, a main port through which gas may pass from the end combustion chamber of the cylinder into the secondary chamber, means to fire a charge in one of said chambers, a constantly open bleed port between said combustion chambers through which ignited gas may pass to fire a charge in one chamber from a burning charge in the other chamber, a valve controlling said main port, means holding the valve open during said compression and closed during the burning of the charges, and an outlet through which gas from the secondary chamber discharges in the form of a reactive jet.

MARION MALLORY.

REFERENCES CITED

The following references are of record in the file of this patent:

UNITED STATES PATENTS

| Number | Name | Date |
|---|---|---|
| 1,889,650 | Frederickson | Nov. 29, 1932 |

FOREIGN PATENTS

| Number | Country | Date |
|---|---|---|
| 552,921 | France | Jan. 31, 1923 |